Figure 1:
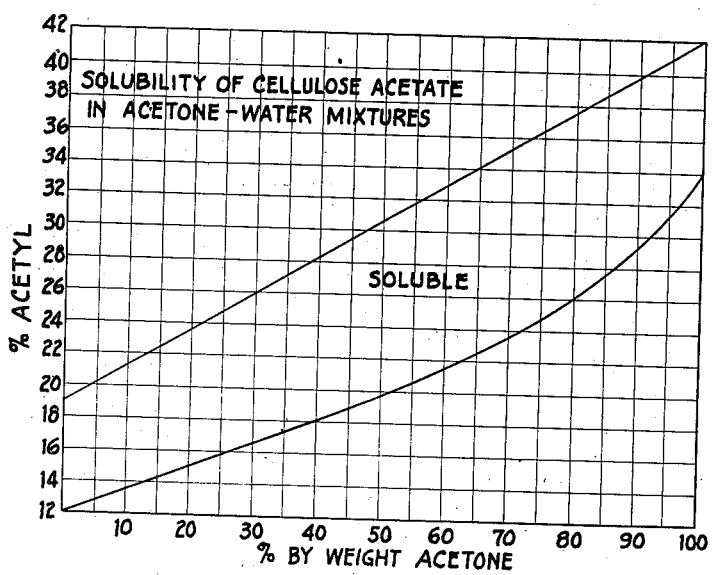
Figure 2:
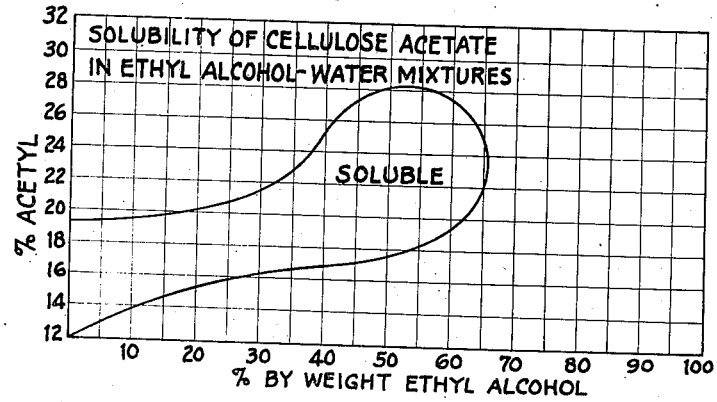
Figure 3:
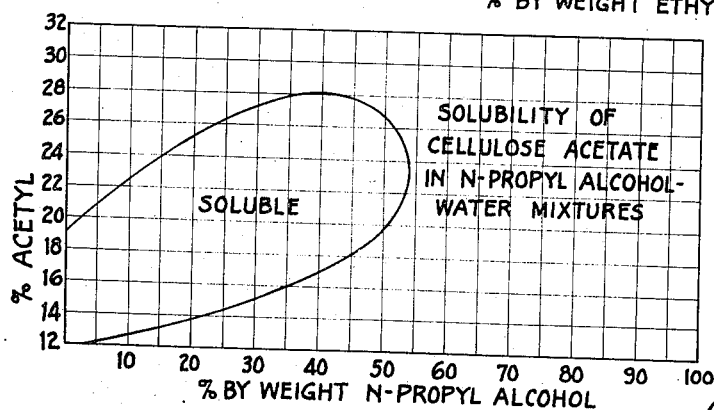

Aug. 24, 1943.        C. L. CRANE        2,327,770
METHOD OF PREPARING FAR-HYDROLYZED CELLUOSE ESTERS
Filed Nov. 23, 1940

CARLTON L. CRANE
INVENTOR

BY N. M. Perrin
Daniel J. Mayne
ATTORNEYS

Patented Aug. 24, 1943

2,327,770

UNITED STATES PATENT OFFICE 2,327,770

METHOD OF PREPARING FAR-HYDROLYZED CELLULOSE ESTERS

Carlton L. Crane, Rochester, N. Y., assignor to Eastman Kodak Company, Rochester, N. Y., a corporation of New Jersey Application November 23, 1940, Serial No. 366,856

15 Claims. (Cl. 260—230)

This invention relates to the preparing of far hydrolyzed cellulose esters in an aqueous solution of a water miscible organic solvent having a boiling point lower than that of water, which solution contains a small proportion of a mineral acid catalyst.

Heretofore, in the preparing of far hydrolyzed cellulose esters, the completed reaction mixture has been converted to a hydrolyzing bath, for instance, by the addition of aqueous organic acid thereto. If necessary, further water or dilute acid was added from time to time to promote the hydrolysis. In order to separate the far hydrolyzed ester from the mass, it was necessary to employ large amounts of water, providing the ester had not been hydrolyzed to water solubility. Where water solubility was attained, precipitation in volatile solvents in which the ester was insoluble has been employed. As the water is the lower boiling liquid in the mixture of acetic or some other organic acid and water, the recovery of the acetic acid or other acid present was very much complicated.

The presence of a large quantity of lower fatty acid in the hydrolysis mass also makes for a comparatively small rate of hydrolysis of the cellulose esters which, unless considerable care is employed, may result in degradation of the cellulose ester.

One object of my invention is to provide a method for far hydrolyzing lower fatty acid esters of cellulose in which the liquid from which the ester is separated admits of easy recovery. Another object of my invention is to provide a hydrolyzing process which proceeds at a rate which retards degradation of the cellulose ester being hydrolyzed. A further object of my invention is to provide a hydrolysis process which makes possible the easy separation of the cellulose ester from the hydrolyzing liquid when the ester has been hydrolyzed to the desired acyl content.

I have found that by starting with cellulose acetate or some other lower fatty acid ester of cellulose, which has been prepared and purified in the usual manner and which is then redissolved in an aqueous solution of a water miscible organic solvent having a boiling point lower than that of water in which the cellulose ester is soluble, the hydrolysis to water susceptibility or water solubility may be easily carried out by using a mineral acid catalyst and holding the temperature at room temperature or above but in most cases under the boiling point of the solvent. In some cases it is desirable to hold the reaction temperature above the boiling point of the liquid used as a solvent in order to promote solution. For instance, in the hydrolysis of cellulose acetate of 38–38.5% acetyl in alcohol-water mixtures boiling temperatures are desirable. Where the starting material is a cellulose ester containing a large amount of acyl, it is ordinarily necessary to add additional water to the mass. As the hydrolysis proceeds, the water may be added with or without additional solvent. It is preferred, however, to add the water without additional solvent, as I have found that this is more economical than by adding solvent with the water.

My invention relates to the far hydrolyzing of organic acid esters of cellulose, containing acyl groups of 2–4 carbon atoms, in which the acetyl groups predominate. By the far hydrolysis of such a cellulose ester is meant reducing the acyl content to water susceptibility or to water solubility or in other words to an acyl value between 28 and 13%. Ordinarily the cellulose esters, having an acyl content of 13–19%, are water soluble, while those in the upper part of the range are susceptible to penetration by water and also are soluble in solvent mixtures containing a considerable proportion of water.

As the starting material of my hydrolysis method a cellulose ester is employed. One may use a fully esterified cellulose ester providing it is soluble in the organic solvent which is employed. In the case of the simple cellulose triacetate, however, no water miscible solvent, having a boiling point less than that of water, is known. However, the ordinary commercial cellulose acetate, such as having an acetyl content of 38–42%, may be employed, the amount of water in the initial dissolving liquid being adjusted to the acyl content of the ester. With both the cellulose acetate and other cellulose esters, such as cellulose acetate propionate and cellulose acetate butyrate, the amount of water in the initial solvent used is governed by the acyl content of the starting material. For instance, if the starting material used is a cellulose acetate, having an acetyl content of 41.5–42%, or in other words, near the beginning of acetone solubility, the dissolving liquid, if acetone, may not contain any water and after the ester is dissolved, the addition of water will precipitate it. Therefore a small amount of ethyl or methyl alcohol may be the first addition to get the hydrolysis started. If, however, the starting material is a cellulose acetate having an acetyl content of approximately 38%, the solvent used to dissolve the ester may contain some water. If the starting material is a cellulose acetate having an acetyl content of 35%, the solvent, which dissolves the cellulose ester, may have a substantial proportion of water therein as this ester is insoluble in acetone alone but soluble in acetone having a considerable water content.

After the dissolving of the cellulose ester, a small amount of a mineral acid catalyst is added. Hydrochloric acid is preferred for this purpose, as it gives a high rate of hydrolysis and results in products which are stable. Other mineral acids, however, may be used if their properties are not objectionable. For instance, phosphoric acid can be employed, however, the hydrolysis rate is considerably less than when hydrochloric acid is used. Nitric acid may be employed, however, there is a tendency to color the product. With the use of sulfuric acid, the obtaining of a stable product has to be considered. The proportion of catalyst employed is usually between .01% and 30%, based on the cellulose ester. Any temperature which is at least room temperature may be employed. Ordinarily a temperature of 100° F. gives a satisfactory rate of hydrolysis and, therefore, is suitable in this connection. As pointed out above, water is ordinarily employed as the hydrolyst in my hydrolyzing process, but alcohol may be used in whole or in part in this connection.

My process is economical in that the ester is dissolved originally, preferably in from 3–12 parts of the solvent or solvent mixture and besides the catalyst, additions of water are all that are required in carrying out my hydrolysis process. Ordinarily, I prefer to use five parts of solvent or solvent mixture for each part of ester in my process, but it is to be understood that this ratio may vary according to the solubility and viscosity of the ester which is employed as the starting material.

My invention contemplates the use of water miscible solvents which will dissolve the cellulose ester initially. This may be acetone or in the case of cellulose esters which have been hydrolyzed to a considerable extent, ethyl, propyl or methyl alcohol may be employed. For instance, with a cellulose acetate which has been hydrolyzed down to an acetyl content of 35%, ethyl alcohol and water may be employed to dissolve the ester preparatory to its hydrolysis down to water susceptibility.

The attached drawing is a graph giving the solubilities of cellulose acetates of varying degrees of hydrolysis in solvents which I have found useful. These graphs also point out the solubilities of cellulose acetate in the various mixtures of those solvents with water. Figure I shows the solubility of cellulose acetates of various acetyl contents in acetone-water mixtures. Figures II and III relate to the solubilities of cellulose acetates in ethyl alcohol-water and propyl alcohol-water respectively.

The solvent combinations for hydrolyzed mixed esters of cellulose depend upon several factors principally the proportion of the various acyls, the hydroxyl content and the viscosity. For example, a hydrolyzed cellulose acetate propionate of 30–32% acetyl and 15–17% propionyl will dissolve in mixtures of 85–100% aqueous acetone. A mixed ester with 25.5–27.5% acetyl and 15–17% propionyl will dissolve in mixtures of 70–100% aqueous acetone. A mixed ester with 23–25% acetyl and 14.5–16.5% propionyl will dissolve in 66–100% aqueous acetone.

After the hydrolysis has occurred in accordance with my invention, the ester may be separated therefrom by adding an amount of the organic solvent to the mass to precipitate the ester therefrom. If the ester has not been hydrolyzed down to water solubility, it may be precipitated by adding a large amount of water to the mass. The ester, after separating off, may be washed with either water or the organic solvent, except where the ester is water soluble, in which case only washing with the organic solvent can be employed. The organic solvent may easily be recovered from the mass. Having a boiling point below that of water, it may be distilled from the water, thus entailing a considerable saving in solvent recovery cost. Also, if the cellulose ester is washed with the organic solvent, it is easily dried due to the high vapor pressure of that solvent.

The following examples illustrate my invention:

Example I

Seven pounds of a cellulose acetate propionate, having a propionyl content of 16% and an acetyl content of 31%, was dissolved in a mixture of 34 pounds of acetone and three pounds of water. .7 pound of acetone and .8 pound of hydrochloric acid (35%) was added thereto and the mass was kept at a temperature of 100° F. for 36 hours. Ten pounds of water was added thereto and after 36 more hours, 15 pounds of water was added and after 36 further hours, 15 more pounds of water was added. The hydrolysis was allowed to go for 189 hours whereupon it was precipitated and washed in water. A cellulose ester was obtained having an acetyl content of 13.9% and a propionyl content of 10.4%.

Example II

Three pounds of a cellulose acetate, having an acetyl content of 38%, was dissolved in a mixture of one pound of water and 12.5 pounds of acetone. A mixture of .3 pound of water, 155 grams of hydrochloric acid (35%) and one pound of acetone was added thereto. The mass was then maintained at 100° F. for 72 hours. At the following times, the designated amounts of water were added to the mass:

| Hours | Pounds |
| --- | --- |
| 12 | 2.0 |
| 24 | 2.5 |
| 36 | 5.0 |

The resulting water-susceptible cellulose acetate was precipitated and washed with tap water. The cellulose ester obtained had an acetyl content of 23.7%.

Example III

One pound of cellulose acetate, having an acetyl content of 40%, was dissolved in seven pounds of acetone. A mixture of one pound of ethyl alcohol and one pound of acetone, then one of 18 cc. of sulfuric acid (95%) and one pound of acetone were added. The mass was held at 100° F. until the mass gelled. It was then diluted with water and held at 100° F. for a further period. The water-susceptible cellulose acetate formed was precipitated and washed with water. A cellulose ester was obtained having an acetyl content of 31.9%. If desired, instead of precipitating at this point, further additions of water may be made and the hydrolysis may be carried out to a point at which the acetyl content is between 13 and 19% to obtain a water soluble ester. This would necessitate precipitating with acetone or with alcohol.

Example IV

1½ pounds of cellulose acetate, having an acetyl content of 32½-33½%, was dissolved in nine pounds of a mixture of equal parts of 95% ethyl alcohol and water at 150° F. 5 cc. of 95% sulfuric acid dissolved in one pound of a mixture of equal parts of 95% ethyl alcohol and water was added to the solution. The mass was divided into two equal parts, one part being allowed to hydrolyze 15 hours and the other 48 hours. The fifteen-hour hydrolyzed ester was precipitated in water, washed and dried. The forty-eight-hour hydrolyzed cellulose acetate was precipitated in methyl alcohol, washed in methyl alcohol and dried. The solubility and acetyl content were as follows:

| Time of hydrolysis | 1 acetone:4 water | 1 acetone:1 water | H₂O | Acetyl |
|---|---|---|---|---|
| | | | | Per cent |
| 15 hrs | − | + | − | 27.6 |
| 48 hrs | + | Swollen | + | 15.8 |

Example V

1½ pounds of cellulose acetate, having an acetyl content of approximately 33%, was dissolved in nine pounds of 40% n-propyl alcohol at 150° F. 5 cc. of sulfuric acid (95%) dissolved in one pound of 40% n-propyl alcohol was added to the solution. The mass was divided into two parts, the first half being hydrolyzed 15 hours and the second half being hydrolyzed 48 hours. The first half was precipitated, washed in water and dried, the second half was precipitated, washed in methanol and dried. The solubilities and acetyl contents were as follows:

| Time of hydrolysis | 1 acetone:4 water | 1 acetone:1 water | H₂O | Acetyl |
|---|---|---|---|---|
| | | | | Per cent |
| 15 hrs | − | + | − | 26.1 |
| 48 hrs | + | Swollen | + | 16.6 |

Example VI

.7 pound of cellulose acetate, having an acetyl content of approximately 38.5%, was dissolved in 4.6 pounds of a mixture of equal parts of 95% ethyl alcohol and water at 200° F. .3 pound of a mixture of equal parts of 95% ethyl alcohol and water containing 1.84 grams of 95% sulfuric acid was added to the solution. The mass was separated into two equal parts, one-half being allowed to hydrolyze for nine hours and the other half for 15 hours. In both cases the ester was precipitated, washed in water and dried. The solubilities and acetyl contents were as follows:

| Time of hydrolysis | 4 acetone:1 water | 1 acetone:1 water | 1 acetone:4 water | Acetyl |
|---|---|---|---|---|
| | | | | Per cent |
| 9 hrs | + | Swollen | Insol. | 31.1 |
| 15 hrs | + | Sol. | Insol. | 29.2 |

It will be noted that the actual percent composition of the solvent mixture here is 47.5% ethyl alcohol by weight. The boiling point of such a mixture is about 180° F. However, the hydrolysis was carried out at 200° F. or 20° F. above the boiling point of the mixture in order to promote solution of the cellulose ester therein.

In the tables accompanying the examples a plus (+) indicates solubility and a minus (−) designates insolubility.

I claim:

1. A process for preparing a far-hydrolyzed cellulose ester which comprises dissolving a lower fatty acid ester of cellulose in a solvent therefor comprising an organic solvent which is water-miscible and has a boiling point less than that of water, adding a mineral acid hydrolyzing catalyst and a compatible hydrolyst thereto and maintaining at, at least room temperature but below the boiling point of the solvent, accompanied by additions of water from time to time to keep the cellulose ester in solution, until the cellulose ester has an acyl content between 28% and 13%.

2. A process for preparing a far-hydrolyzed cellulose ester which comprises dissolving a cellulose acetate in a solvent therefor comprising an organic solvent which is water-miscible and has a boiling point less than that of water, adding a mineral acid hydrolyzing catalyst and a compatible hydrolyst thereto and maintaining at, at least, room temperature but below the boiling point of the solvent, accompanied by additions of water from time to time to keep the cellulose acetate in solution until it has an acetyl content between 28% and 13%.

3. A process for preparing a far-hydrolyzed cellulose ester which comprises dissolving a lower fatty acid ester of cellulose in a solvent therefor comprising an organic solvent which is water-miscible and has a boiling point less than that of water, adding a mineral acid hydrolyzing catalyst and water in a compatible amount thereto and maintaining at, at least, room temperature but below the boiling point of the solvent, accompanied by additions of water from time to time to keep the cellulose ester in solution until the cellulose ester has an acyl content between 28% and 13%.

4. A process for preparing a far-hydrolyzed cellulose ester which comprises dissolving a lower fatty acid ester of cellulose in a solvent therefor comprising acetone, adding a mineral acid hydrolyzing catalyst and a compatible amount of water thereto and maintaining at, at least, room temperature but below the boiling point of the solvent, accompanied by additions of water from time to time to keep the cellulose ester in solution until the cellulose ester has an acyl contact between 28% and 13%.

5. A process for preparing a far-hydrolyzed cellulose ester which comprises dissolving a lower fatty acid ester of cellulose in a solvent therefor comprising an organic solvent which is water-miscible and has a boiling point less than that of water, adding a hydrochloric acid hydrolyzing catalyst and a compatible hydrolyst thereto and maintaining at, at least, room temperature but below the boiling point of the solvent, accompanied by additions of water from time to time to keep the cellulose ester in solution until the cellulose ester has an acyl content between 28% and 13%.

6. A process for preparing a far-hydrolyzed cellulose ester which comprises dissolving a lower fatty acid ester of cellulose in a solvent therefor comprising an organic solvent which is water-miscible and has a boiling point less than that of water, adding a mineral acid hydrolyzing catalyst and a compatible hydrolyst thereto and maintaining at a temperature of 100° F., accompanied by additions of water from time to time to keep the cellulose ester in solution until the cellulose ester has an acyl content between 28% and 13%.

7. A process for preparing a far-hydrolyzed cellulose ester which comprises dissolving a lower fatty acid ester of cellulose in a solvent therefor comprising an organic solvent which is water-miscible and has a boiling point less than that of water, adding a hydrochloric acid hydrolyzing catalyst and water in a compatible amount and maintaining at at least room temperature but below the boiling point of the solvent, accompanied by additions of water from time to time to keep the cellulose in solution until the cellulose ester has an acyl content between 28% and 13%.

8. A process for preparing a far-hydrolyzed cellulose ester which comprising dissolving a cellulose acetate in a solvent therefor comprising acetone, adding a hydrochloric acid hydrolyzing catalyst and water in compatible amount and maintaining at approximately 100° F., accompanied by additions of water from time to time to keep the cellulose ester in solution until the cellulose ester has an acyl contact between 28% and 13%.

9. A process for preparing a far-hydrolyzed cellulose ester which comprises treating a lower fatty acid ester of cellulose, having an acyl content of approximately 38.5% to approximately 32%, with aqueous alcohol the alcohol having a boiling point less than that of water and approximately 1-5% of a mineral acid hydrolyzing catalyst at a temperature conducive to dissolving of the cellulose ester therein until the cellulose ester has an acyl content between 28 and 13%.

10. A process for preparing a far-hydrolyzed cellulose acetate which comprises treating a cellulose acetate, having an acetyl content of approximately 38.5% to approximately 32%, with aqueous alcohol the alcohol having a boiling point less than that of water and approximately 1-5% of a mineral acid hydrolyzing catalyst at a temperature conducive to dissolving of the cellulose ester therein until the cellulose ester has an acetyl content between 28 and 13%.

11. A process for preparing a far-hydrolyzed cellulose ester which comprises treating a lower fatty acid ester of cellulose, having an acyl content of approximately 38.5% to approximately 32%, with aqueous ethyl alcohol and approximately 1-5% of sulfuric acid at a temperature conducive to dissolving of the cellulose ester therein until the cellulose ester has an acyl content between 28 and 13%.

12. A process for preparing a far-hydrolyzed cellulose acetate which comprises treating a cellulose acetate having an acetyl content of approximately 33% with aqueous alcohol the alcohol having a boiling point less than that of water and approximately 1-5% of a mineral acid hydrolyzing catalyst at a temperature conducive to dissolving of the cellulose ester therein until the cellulose ester has an acetyl content between 28 and 13%.

13. A process for preparing a far-hydrolyzed cellulose ester which comprises treating a lower fatty acid ester of cellulose, having an acyl content between approximately 38.5% and approximately 32%, with aqueous ethyl alcohol and approximately 1-5% of hydrochloric acid at a temperature conducive to dissolving of the cellulose ester therein until the cellulose ester has an acyl content between 28 and 13%.

14. A process for preparing a far-hydrolyzed cellulose ester which comprises treating a lower fatty acid ester of cellulose having an acyl content between approximately 38.5% and approximately 32% with aqueous ethyl alcohol and approximately 1-5% of a mineral acid hydrolyzing catalyst at a temperature conducive to dissolving of the cellulose ester therein until the cellulose ester has an acyl content between 28 and 13%.

15. A process for preparing a far-hydrolyzed cellulose ester which comprises treating a lower fatty acid ester of cellulose having an acyl content between approximately 38.5% and approximately 32% with aqueous ethyl alcohol and approximately 1-5% of sulfuric acid at a temperature conducive to dissolving of the cellulose ester therein until the cellulose ester has an acyl content between 28 and 13%.

CARLTON L. CRANE.